Sept. 18, 1934. W. BIEHN 1,974,008
WIND TURBINE
Filed Jan. 25, 1933 2 Sheets-Sheet 2
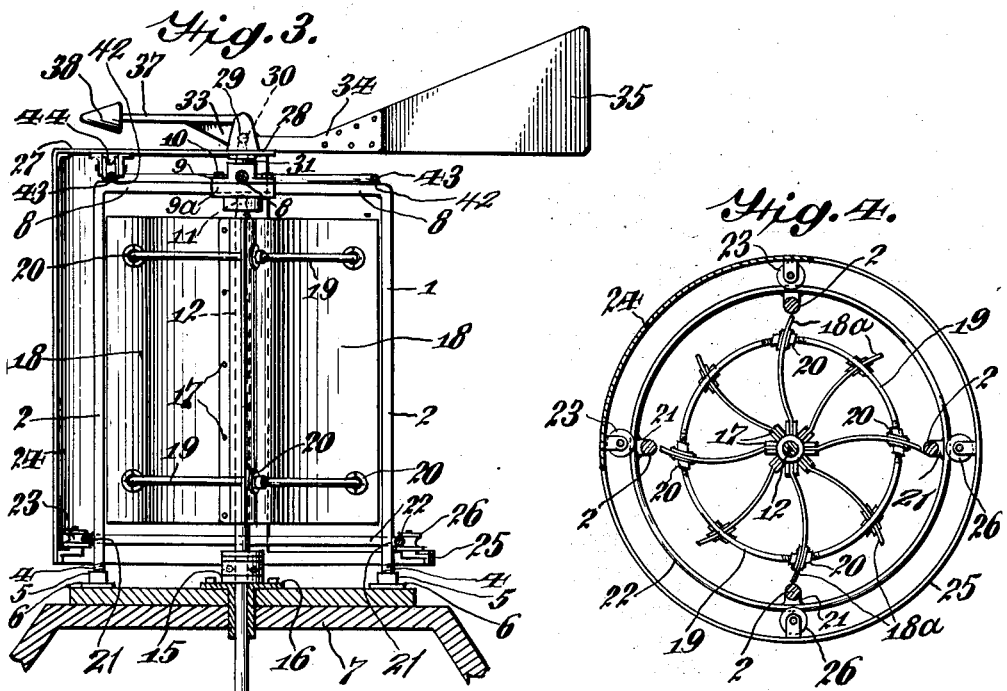
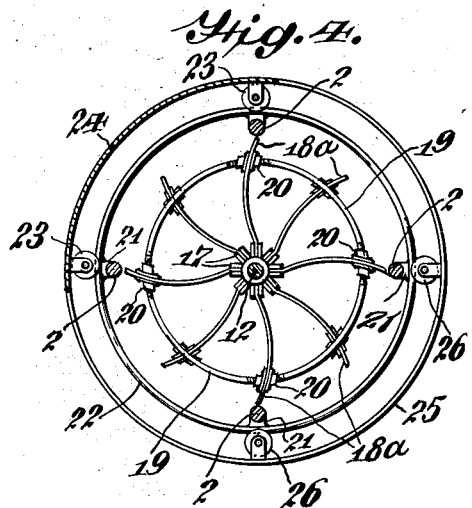
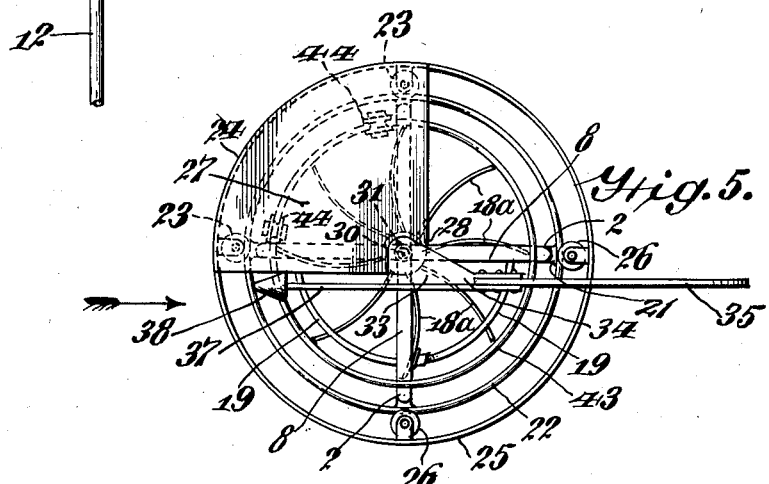
Warren Biehn,
INVENTOR
BY Victor J. Evans
ATTORNEY

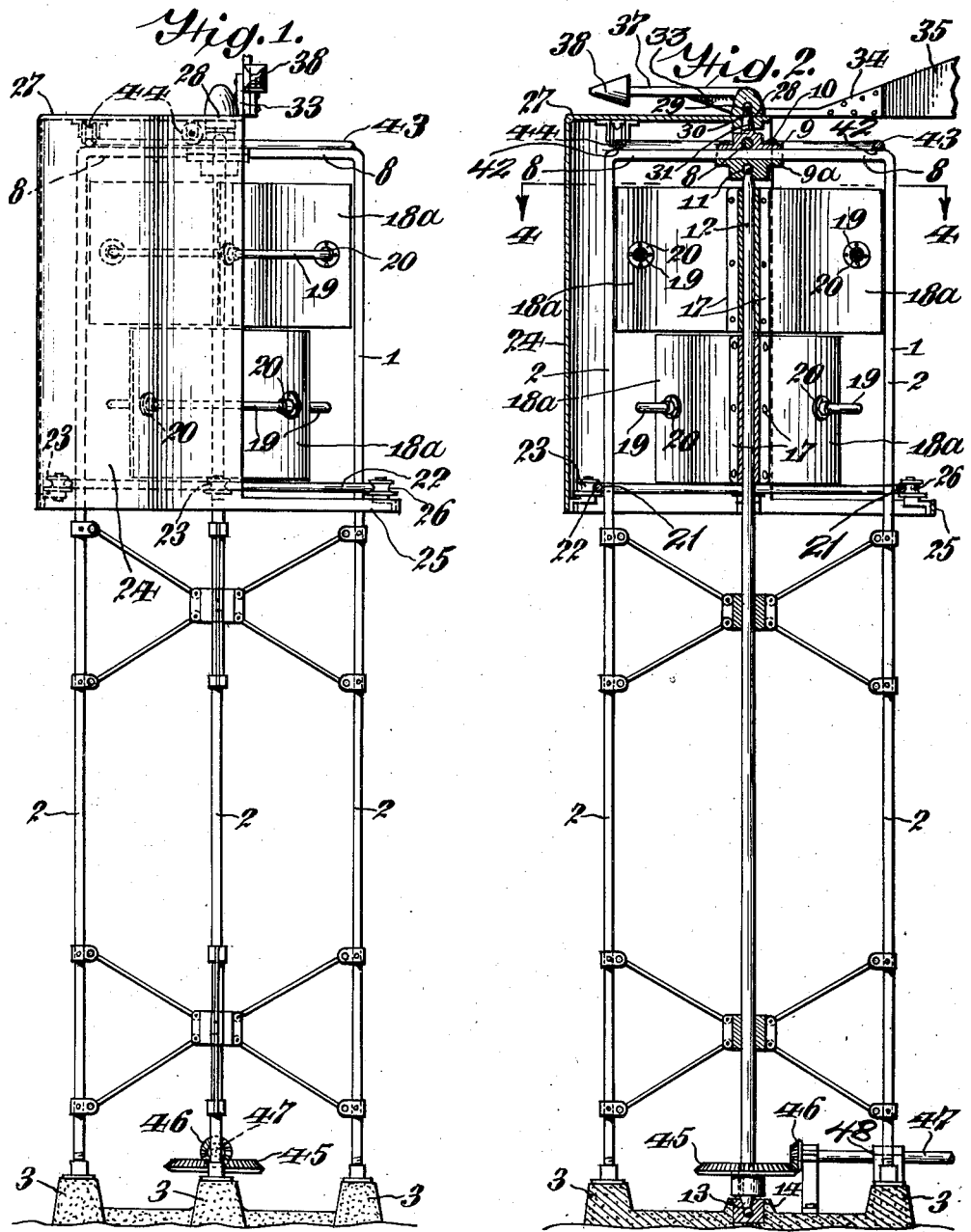

UNITED STATES PATENT OFFICE 1,974,008

WIND TURBINE

Warren Biehn, Philadelphia, Pa.

Application January 25, 1933, Serial No. 653,525

3 Claims. (Cl. 170—15)

The present invention relates to an improved wind turbine designed and manufactured for generating power, adapted for use in connection with and operating various devices and machinery.

The invention has for its purpose the provision of a turbine of this kind where its ability is such as to withstand winds of severe storm velocity without damage.

Another purpose is to provide, in a machine of this kind a structure which would permit its manufacture in various sizes, capable of substantial power, even in a light wind.

Another purpose is to provide, in a machine of this kind a wind shielding element so balanced relative to a wind vane as to enable the vane to operate on a thrust bearing without undue strain on the various parts.

Another purpose is to provide a shielding element so mounted as to avoid leverage strain on any elements associated with the bearing of the shield or other parts of the mechanism.

Another purpose is to provide a turbine of this kind which insures durability of the various parts as well as safety to human life.

Another purpose is to provide a turbine of this kind that can be constructed for use in operating toys, or constructed large enough to provide considerable power output.

A further purpose is to provide a turbine, wherein the propeller includes a multiple of blades, which may be solid in area from the top to the bottom, or the blades in sections, the lower sections intervening the upper sections, thereby providing greater area on which the wind may impinge for imparting movement to the propeller.

A still further purpose is the provision of a turbine, wherein the shield is properly balanced with the vane, so that when the position of the vane is changed according to the change of the wind directions, the shield will not be obstructed in its movements, and also wherein the shield includes means for preventing displacement of the shield, namely preventing its disengagement from its thrust bearing at the top of the tower.

A still further purpose is to provide tracks on which rollers of the shield travel, during the rotation of the shield, according to the direction of the wind currents.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is a view in elevation of the improved turbine, wherein the tower is constructed for installation on the ground.

Figure 2 is a view partly in elevation and partly in section of the upper part of the turbine as disclosed in Figure 1, but showing the blades in sections, the lower sections intervening with the upper sections.

Figure 3 is a view in elevation of the turbine showing the frame of a size for installation on a roof of a building, so that the higher wind currents may impinge with the blades of the propeller.

Figure 4 is a horizontal sectional view on line 4—4 of Figure 2.

Figure 5 is a plan view.

Referring to the drawings 1 identifies a tower, which may be constructed of tubular uprights 2, which as shown in Figure 1 are anchored in concrete or similar foundations 3. Referring to Figure 3 these uprights may be threaded as shown at 4 in bosses 5 of metal plates 6, which in turn may be secured at 7 to the roof of a building.

The upper portions of the uprights 2 merge into intersecting radial portions 8, which are fastened together by upper and lower castings 9 and 9a, which are bolted together as at 10.

Mounted in a thrust bearing 11 of the lower casting 9a is a shaft 12, the lower end of which is mounted in a thrust bearing 13 incased in a concrete foundation 14 at the lower part of the tower. In Figure 3 the lower end of the shaft 12 is mounted in a bearing of a plate 15 secured at 16 to the roof.

Carried by and secured to the shaft 12 at 17 are blades 18, which in Figure 3 are solid throughout their length from the top to the bottom. However in Figures 1, 2, 4 and 5 the blades 18a are in upper and lower sections, thereby providing greater area in which the wind currents may impinge for creating substantial power.

The blades 18 and 18a are relatively reinforced by the curved rods 19, which are secured in sockets 20 in plates, which are bolted to the blades, thereby retaining the blades (which are curved) in rigid positions relative to the shaft 12.

Electrically welded or otherwise secured at 21 to the uprights 2 is a curved track 22, which not only serves to reinforce the uprights, but also is engaged by roller 23 operatively mounted upon the inner surface of the shield 24. The rollers 23 are of the grooved type, and the lower flanges of these rollers are greater than the upper flanges, which prevent any upward movement of the shield. Connecting the opposite edges of the shield is a curved rod or rail 25, and carried by the rod or rail 25 are additional rollers 26, which are similar in construction to the rollers 23, which prevent tilting of the shield. The upper portion of the shield merges into a segment top 27, and the curved end 28 of the segment top has a socket 29 including a thrust bearing 30 on a stud 31, projecting upwardly from the upper casting 9 which assists in holding the radial portions of the uprights in position.

Also supported on the segment top of the shield is a frame 33 having a projecting arm 34 provided with a vane 35. Extending in an opposite direction to the vane and braced relative to the frame 33 is an arm 37 carrying a weight 38, and through the medium of which the vane and the shield are balanced.

The radial portions (which form the top of the frame tower) of the uprights have electrically welded thereto a circular track 43 similar to the lower track, and engaged therewith are grooved rollers 44 carried by the segment top, thereby providing a mounting for the shield.

The lower end of the shaft 12 is provided with a beveled gear 45, and meshing therewith is a similar beveled gear 46 carried by a shaft 47 mounted in a bearing 48. This shaft 47 may be used for conveying power to any suitable machinery (not shown) for operating same.

Where the turbine is mounted on a roof level the shaft 12 would necessarily pass through the building, therefore its lower end (not shown) in the lower part of the building (not shown) would be equipped with gearing for transmitting power to any suitable source of consumption.

By means of the roller mountings of the shield, the shield and the vane are evenly balanced and supported. It is obvious that the tracks for the mounting of the shield may be increased in number if necessary. Also where the rollers or wheels engage with the tracks suitable clearance may be provided between them and the tracks for permitting of a slight play between such parts to insure proper movement of the shield incident to the wind currents. By means of the construction of the rollers at the lower end of the shield the shield and the vane will be prevented from being blown off.

The invention having been set forth, what is claimed is:

1. In a wind turbine, a skeleton tower, upper and lower circular tracks, the upper track being on the top of the tower, the lower track encircling the tower at a point a substantial distance below the upper track, a propeller in the upper part of the tower including a shaft mounted in bearings of the tower and from which power may be taken to any suitable source of consumption, a shield having a top including a bearing on top of the tower, rollers depending from the top of the shield and engaging down upon the upper circular track to insure the freedom of movement of the shield, rollers on vertical axes mounted at the lower part of the shield on its inner face and engaging laterally against the lower track to retain the shield concentric with said shaft, said lower rollers having means cooperating with the lower track to prevent upward movement of the shield, and a balanced vane carried by the top of the shield, to direct and position the shield according to the direction of the wind.

2. In a wind turbine, a skeleton tower, said tower having vertical bearings and a thrust bearing at its extreme upper end, a shaft journaled in said vertical bearings with its upper end engaged with the thrust bearing, said thrust bearing comprising opposed members connecting intersecting rods of the skeleton tower, a lower track encircling the tower and supported thereby, a circular upper track on the upper end of said tower, a segment shield concentric with the tower and having a top, an end of the top having a thrust bearing on one of the members of the first thrust bearing, traction means carried by the top of the shield and engaging with said upper track, the lower part of the shield on its interior provided with traction means at a plurality of diametrically opposite locations engaging with the lower circular track, a balanced vane carried by the top of the shield, said last named lower traction means including elements engaging under the lower circular track, thereby preventing upward movement of the shield and also counteracting the weight of the vane as well as supporting the super structure of the shield, and a propeller carried by said shaft.

3. In a wind turbine, the combination with a skeleton frame comprising vertical rods positioned at a plurality of diametrically opposite locations, the upper portions of the rods terminating in radial portions intersecting each other, of clamping elements connecting the intersecting parts of the radial portions of said rods, one of the elements having a thrust bearing, a vertical shaft provided with a propeller having curved blades, the upper end of said shaft being mounted in said thrust bearing, circular rods connecting said blades rendering them relatively rigid, a segmental shield concentric with the frame and the propeller and provided with a top having a thrust bearing connection with the other clamping element, an upper circular track mounted on the top of the radial portions of the frame, traction members carried by the top of the shield and engaging the upper circular track, a lower circular track concentric to and carried by the vertical rods of said frame, the lower end of the shield having a complete annular portion concentric to said lower track, said annular portion having lower traction members engaging the lower circular track, said lower traction members having means to prevent upward movement of the shield, and a balanced vane carried by the top of the shield.

WARREN BIEHN.